United States Patent [19]

Pinkerman, Jr.

[11] Patent Number: 5,140,738
[45] Date of Patent: Aug. 25, 1992

[54] SPLIT COLLAR SEAL

[75] Inventor: Jack N. Pinkerman, Jr., W. Springfield, Mass.

[73] Assignee: Titeflex Corporation, Springfield, Mass.

[21] Appl. No.: 708,780

[22] Filed: May 29, 1991

Related U.S. Application Data

[60] Division of Ser. No. 451,648, Dec. 28, 1989, which is a continuation-in-part of Ser. No. 295,308, Jan. 10, 1989, abandoned.

[51] Int. Cl.⁵ .............................................. B23P 11/02
[52] U.S. Cl. ........................................ 29/451; 29/235; 29/508; 285/243; 285/255
[58] Field of Search ................ 29/508, 454, 457, 234, 29/235, 237, 282, 450, 451; 285/243, 255

[56] References Cited

U.S. PATENT DOCUMENTS

| | | | |
|---|---|---|---|
| 36,410 | 9/1862 | Jucket | 285/255 X |
| 890,414 | 6/1908 | DeWorth | 285/243 |
| 1,039,584 | 9/1912 | Parsons | 285/243 |
| 1,066,935 | 7/1913 | McDaniel | 285/243 |
| 1,331,923 | 2/1920 | Imbach | 285/243 |
| 1,448,615 | 3/1923 | Deibert | 285/243 |
| 2,517,706 | 8/1950 | Paquin | 29/508 X |
| 2,541,200 | 2/1951 | Brubaker | 285/249 |
| 3,191,975 | 6/1965 | LaMarre et al. | 285/243 |
| 3,325,194 | 6/1967 | Grawley | 29/508 X |
| 4,408,786 | 10/1983 | Staemky | 29/508 X |
| 4,412,693 | 11/1983 | Campanini | 285/243 X |
| 4,498,691 | 2/1985 | Cooke | 29/508 X |
| 4,564,222 | 1/1986 | Loler et al. | 285/243 |
| 4,634,153 | 1/1987 | Kishton | 285/255 |
| 4,757,588 | 7/1988 | Churchich | 29/235 |
| 4,932,689 | 6/1990 | Bradley | 285/255 |

FOREIGN PATENT DOCUMENTS

| | | | |
|---|---|---|---|
| 0073048 | 3/1983 | European Pat. Off. | 285/242 |
| 2052293 | 5/1971 | Fed. Rep. of Germany | 285/255 |
| 2510218 | 11/1975 | Fed. Rep. of Germany | 285/255 |
| 41089 | 10/1933 | France | 285/243 |
| 13056 | 4/1971 | Japan | 285/255 |
| 4613056 | 4/1971 | Japan | 285/255 |
| 1275743 | 5/1972 | United Kingdom | 285/255 |
| 1431227 | 4/1976 | United Kingdom | 285/255 |

Primary Examiner—Mark Rosenbaum
Assistant Examiner—C. Richard Martin
Attorney, Agent, or Firm—Louis Bernat

[57] ABSTRACT

An elongated insert has an enlarged central area with wrench faces formed thereon. On one side of the central area, an end of said insert is formed to provide a connector. On an opposite side of the central area, the insert is an elongated pipe having a series of annular barbs formed thereon. An inner split collar fits over and is dog locked to the pipe after it is slipped into the end of a hose. An outer locking collar fits over the split collar, compresses, and secures it in place. Various principles are shown for selecting a degree of locking forces which optimizes and matches the ease of installation vs. the grip that is required.

13 Claims, 3 Drawing Sheets

SPLIT COLLAR SEAL

This application is a division of prior application Ser. No. 07/451,648, filed Dec. 28, 1989, which in turn was a continuation in-part of Ser. No. 07/295,308, filed Jan. 10, 1989, now abandoned.

This invention relates to clamps for attaching fittings onto the end of hoses and more particularly to clamps which may not be cold-formed.

BACKGROUND INFORMATION

A familiar hose fitting often includes an insert which is placed inside an end of a hose. A collar fits around the outside and over the area of the hose containing the insert. Then, the collar is crimped, or otherwise cold-worked, to securely squeeze and lock the tube into a tight contact with the insert. This kind of a fitting requires a use of tools for performing the crimping, which presents problems of convenience, especially when the fitting is attached in the field, and where proper tools may not always be available. Therefore, there is a need for an end fitting which may simply be slipped into place and locked onto the end of a hose, especially in the field.

SUMMARY OF THE INVENTION

Accordingly, an object of the invention is to provide new and improved end fittings for hoses, tubes, and the like. Here, an object is to provide such end fittings which do not require cold metal forming.

A further object is to provide an end fitting that may not be metallic and, therefore, may not be susceptible to corrosion.

Another object is to provide end fittings of the described type which give a high degree of reliability, especially when high internal hose pressures are encountered.

Still another object of the invention is to provide a hose clamp with a plurality of different features which may be combined in different ways to accommodate a great variety of different needs.

Another object of the invention is to provide an end fitting which has a self-locking assembly feature that requires no special tools and which may be simply slipped or hammered into place without requiring threads, clamps or other external fastening devices.

In keeping with an aspect of the invention, these and other objects are accomplished by an insert which fits into an end of a hose or tube. A split inner collar fits over the hose and surrounds the hose or tube. The split enables the collar to slip easily into place over the hose and there to lock into the insert. Then, an outer locking collar is slipped over the split collar in order to close it to seal it onto the hose. The outer locking collar seals the split collar and insert together and locks them into place. The cross-section of the locking collar or split collar may have any of various tapers which may form wedge locking.

BRIEF DESCRIPTION OF THE DRAWINGS

The attached drawings show various features of the invention which may be selected and combined to provide a complete end fitting, wherein.

DETAILED DESCRIPTION OF THE INVENTION

Each of the FIGS. 1-11 is intended to illustrate a feature which may be selected and combined with other features to make a complete end fitting. Those who are skilled in the art will readily perceive how to combine these features to meet any particular needs. One example of such a finished combination is shown in FIG. 12, where the end fitting is attached to a braided hose.

Figure 1:
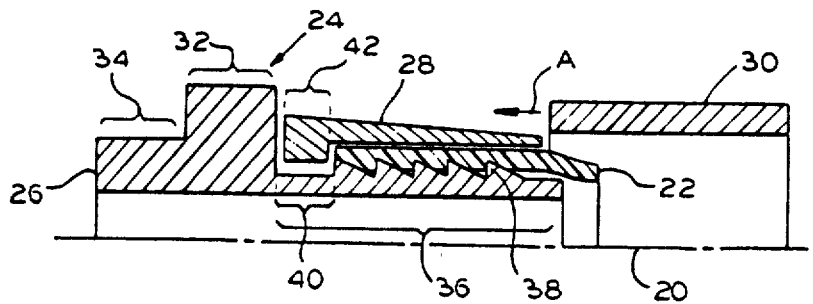
FIG. 1 is a cross-section showing one-half of an end fitting with the inner split collar in place and with the outer locking collar poised to be joined into the fitting.

FIG. 1 and other similar views show one-half of the inventive end fitting. That is, line 20 is a centerline of the hose 22 and end fitting 24. Another identical, but mirror image of the hose and fitting (not shown) is below line 20, as shown in FIG. 12.

The major parts of the end fitting 24 (FIG. 1) are an insert 26 having an end which slips into the end of hose 22, an inner split collar 28 which surrounds the hose, and an outer locking collar 30 which slides over the split collar 28 to lock it in place. The insert has a plurality of wrench faces at 32 to facilitate an attachment of the fitting to associated equipment. On one side 34 of the wrench faces is a suitable connector, usually a threaded end (or the like) which may be turned into any suitable opening. On the other side of the wrench faces 24 is an elongated pipe 36 having a series of annular barbs or grooves, bumps, threads, etc. thereon, one of which is numbered 38. This elongated, barbed pipe 36 is simply inserted into the end of a hose or tube. Preferably, the hose is stretched somewhat as the barbed pipe is pushed into place.

Figure 2:
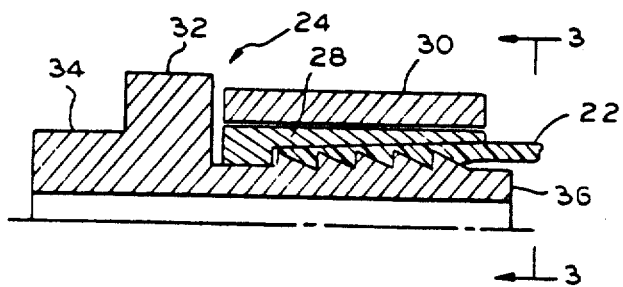
FIG. 2 is a similar cross-section with the outer locking collar in place.

At the root end of the elongated pipe 36, an annular recess 40 provides a first half of a dog lock. The split collar 28 has a annular enlargement 42 which slips into the recess 40 to provide the dog lock. The split in the collar provides enough relief to enable the inner split collar to slip easily into place, as it moves from a position over the outside surface of the hose, toward the left as viewed in FIG. 1 into the final locking position. Once the split inner collar is in place, the outer locking collar 30 is moved in direction A over the split collar, locking it in place, as shown in FIG. 2.

Several approaches may be adopted for installing and locking the inner split collar on the end fitting. The separate pieces of the inner split collar may be joined at restricted locations to for spring-like sections which keep the pieces from falling apart. Except for the restricted locations, the split extends along most of the length of the collar in order to permit it to spread somewhat for easy slippage. The inner split collar may also be completely separate pieces which are temporarily taped in place. The tape holds them together until the outer locking collar is at least partially in place, at which time the tape is removed. Then, the locking collar is slipped into its final position, as shown in FIG. 2.

Figure 3:
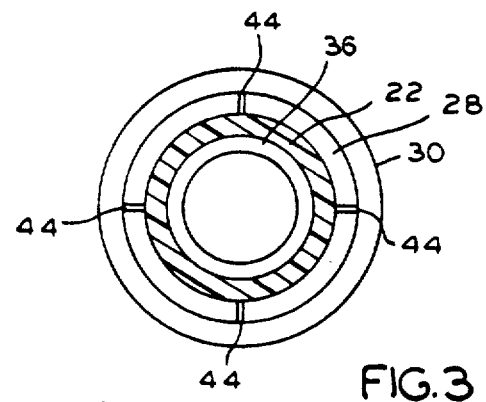
FIG. 3 is an end view of the inventive end fitting taken along line 3—3 of FIG. 2.

FIG. 3 is an end view showing all of the end fitting pieces assembled and locked into place. This particular end view shows four gaps 44 representing the splits forming four parts in the inner locking collar 28. These gaps are closed significantly from their initially opened position in order to radially compress the hose 22 as the collar 30 is emplaced.

Figure 4:
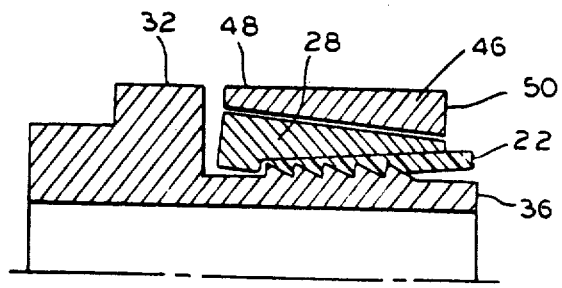
FIG. 4 is a cross-section which includes an outer locking collar and a split collar with tapered cross-sections.

In FIG. 4, the outer locking collar 46 has a tapered cross-section extending from a relatively thin leading edge 48 to a relatively thick trailing edge 50. The further that collar 46 is driven toward wrench faces 32, the more the split collar 28 is compressed and the tighter the seal becomes.

Figure 5:
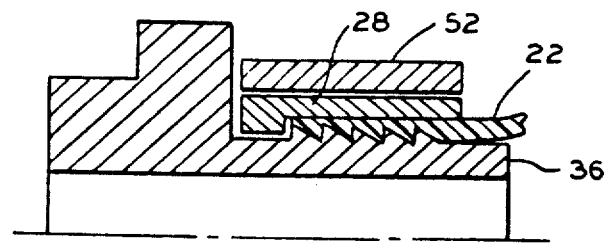
FIG. 5 is a similar cross-section with non-tapered outer locking and split collars.

In FIG. 5, the outer locking collar 52 has a uniform and generally rectangular cross-section which makes it easier to slide the locking collar into place. The decision of whether to use a wedge (FIG. 4) or a non-tapered collar usually turns on the amount of internal pressure which the hose and end fitting must contain as compared to the ease of making the installation.

Figure 6:
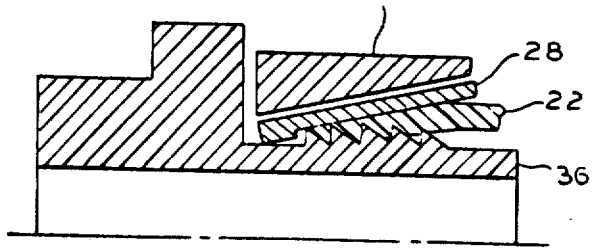
FIG. 6 is a similar cross-section with a reverse tapered outer locking collar.

In FIG. 6, the wedge-shape of locking collar 54 is reversed, which gives the tightest grip on the end of the hose. It is also the most difficult to install. Therefore, the option to use this configuration turns on whether the extra holding power is worth the extra effort required to make the installation.

Figure 7:
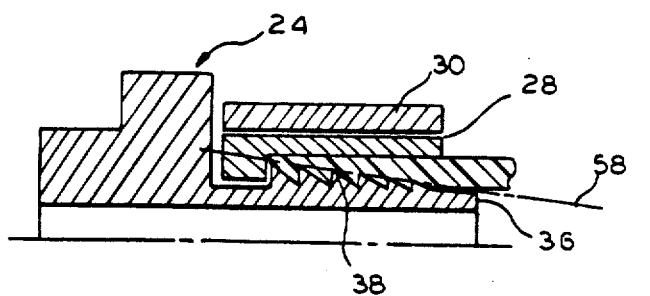
FIG. 7 is a similar cross-section of an insert with barbs or grooves or threads having crests that form a tapered profile.
Figure 8:
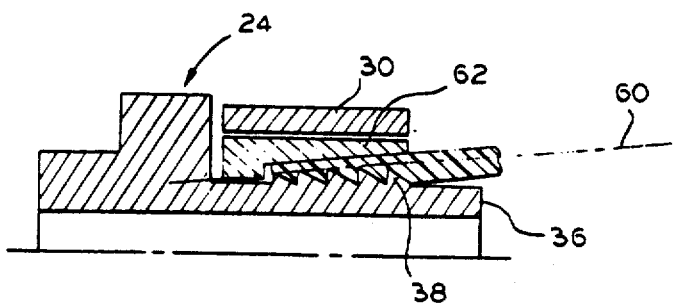
FIG. 8 is a similar cross-section of an insert having crests that form a profile that is reversely tapered, with respect to the taper of FIG. 7.

In FIGS. 7, 8, the shapes of the annular barbs 38 on the tubular end 36 of the insert rise to crests which have an envelope or profile contour that tapers in order to affect the holding capabilities of the fitting vs. the ease of installation. The profile is at the inside wall surface which forms the bore of the hose where it engages the barbs 38. In FIG. 7, the taper is from a relatively small diameter at the distal end of the insert to a relatively large diameter at the proximal end, as indicated by the slope of the dot-dashed line 58. In FIG. 8, the taper is from a relatively large diameter at the distal end to a relatively small diameter at the proximal end, as indicated by the slope of the dot-dashed line 60. The downward slope toward the proximal end indicated by line 58 (FIG. 7) makes an insert which is easy to install, but which has somewhat less holding force. The upward slope of FIG. 6 makes the insert more difficult to install, but which has a somewhat greater holding force.

The various features and configurations which have been described thus far may be mixed and combined in order to satisfy different needs. By way of example, FIG. 8 shows an inner split collar 62 with a tapered cross-section which is used with an outside collar 30 having a rectangular cross-section. However, FIG. 8 could also have been used with the tapered outside locking collar 54 of FIGS. 4 or 6, for example.

Figures 9A, 9B, 9C:
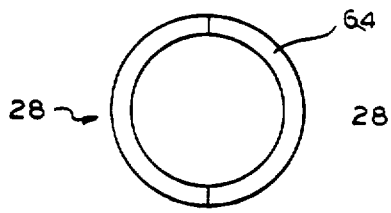
FIGS. 9A, 9B, 9C show three end views of an inner split collar having two, four, and eight pieces respectively.
Figures 10A, 10B, 10C:
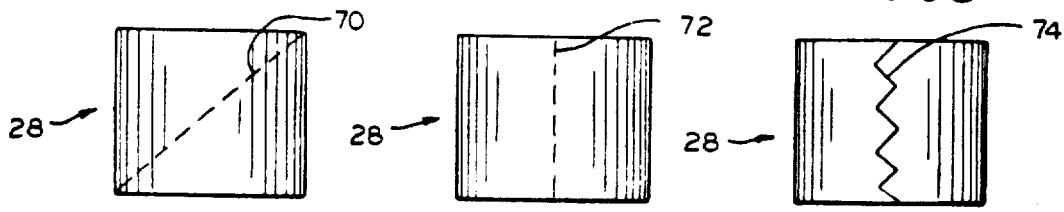
FIGS. 10A, 10B, and 10C show side views of different ways to split an inner split collar.
Figure 11:
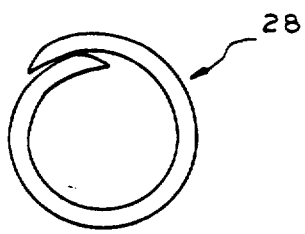
FIG. 11 shows an end view of an inner split collar which is closed to provide overlapped edges to lock a hose in place.
Figure 12:
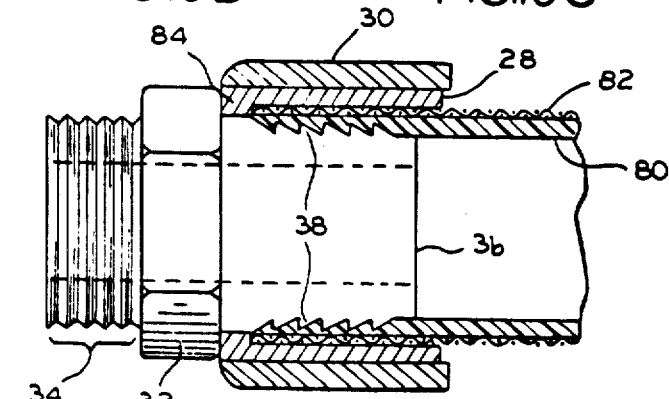
FIG. 12 is an entire end fitting, partially in cross-section, attached on an end of a braided hose to illustrate one embodiment which is made by combining various features shown in earlier figures.

The various configurations of the inner split collar are shown in FIGS. 9-11. As shown by end views in FIGS. 9A, 9B, 9C, there may be any suitable number of splits and pieces to provide a two-piece inner split collar 64 (FIG. 9A), a four-piece split collar 66 (FIG. 9B), and an eight-piece split collar 68 (FIG. 9C). As shown by side views in FIGS. 10A, 10B, 10C, the split 70 may extend at an angle 70 relative to the axis of the collar (FIG. 10A), straight along a side of the inner collar parallel to the axis of the inner split collar (FIG. 10B), or the split may form a row of teeth 74 (FIG. 10C). In any event, as the split collar is squeezed, it will tend to close and reduce its diameter, as seen in FIG. 11, by way of example.

In a similar manner, any suitable ones of the features set forth in FIGS. 1-11 may be combined to fit any suitable need, as illustrated by the exemplary completed end fitting in FIG. 12.

The inner and outer collars 28, 30 (FIG. 12) are slipped over the end of hose 80 and some distance over the hose and away from the end thereof. Hose 80 has a braid 82 which may then be initially taped circumferentially at the end to keep the braid in place. Thereafter, the insert 38 is placed inside the hose by pushing it and/or turning it, in effect, to screw the insert into the hose. Next, the end of the hose is more or less squeezed over the insert to fix the braid in place. Then, the inner split collar 28 is slid up the hose until there is an interconnection at dog lock 84. The split collar is squeezed to close the slits and form a somewhat closed ring about the hose and braid, pressing it against the annular barbs 38. Finally, the outer locking collar is slid over the inner split collar locking it into place.

Various figures show the outer locking collar as having a tapered cross-section, see for example, FIGS. 4, 6, and 8. This angle may have a taper of from 0 to 6 degrees, with the preferred angle of the taper being from 0 to 2 degrees. This preferred angle of taper from 0 to 2 degrees yields the best self-locking force for a split inner collar 28 with a rectangular cross-section, and a locking outer collar 30 with a tapered cross-section.

The 0 to 6 degrees angle of taper is also used with the split inner collars 28 having a tapered cross-section of 0 to 6 degrees and the locking outer collar 30 having a mating tapered cross-section of 0 to 6 degrees (FIG. 4). The cross-section of the locking outer collar 30 may have a full tapered cross-section over its entire length; or, there may be compound tapers with initiations, changes, and terminations of the taper at any point along the length of the inside diameter of the locking outer collar 30. In addition, the split inner collar could have a mating cross-sectional configuration which corresponds to the configuration of the locking outer collar. With the use of a locking outer collar 30 having a tapered cross-section of from 0 to 6 degrees, the dog lock may sometimes be eliminated since the angle of taper of 0 to 6 degrees can provide the self-locking feature in the end fitting.

Figure 13:
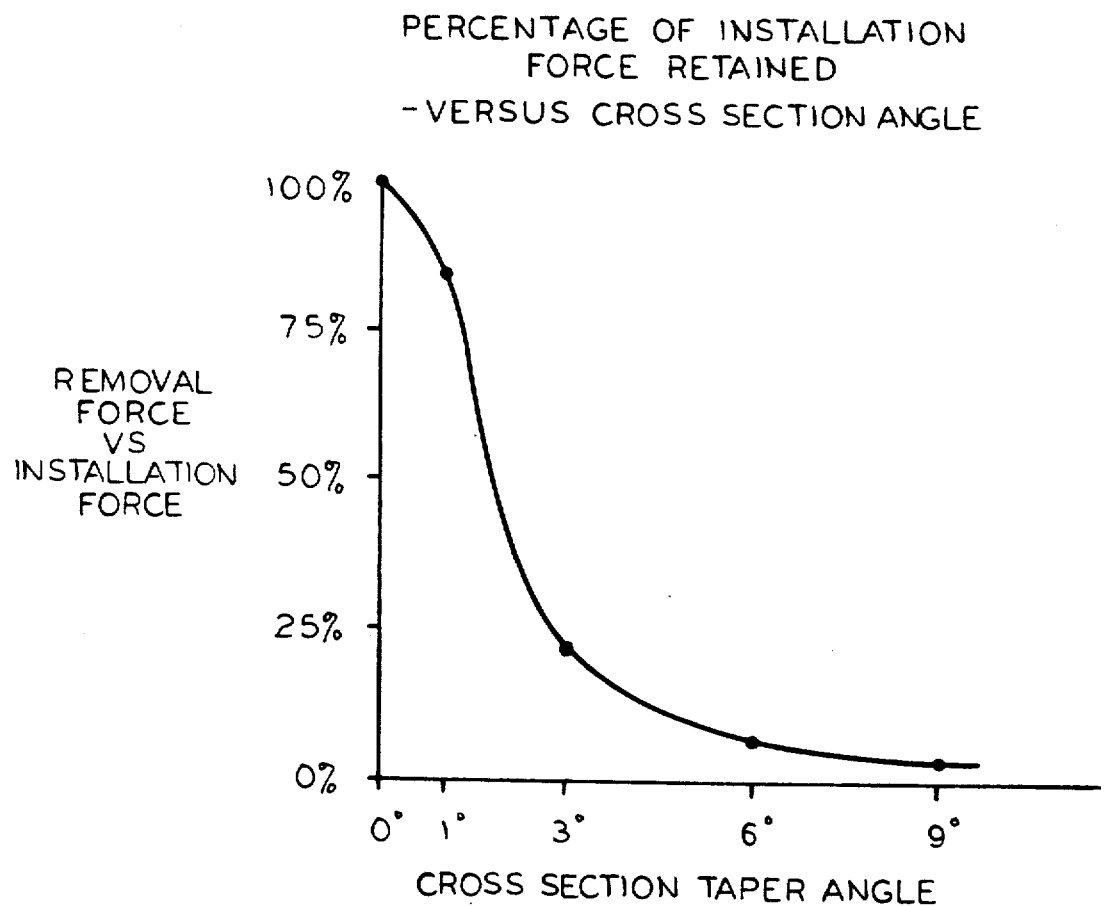
FIG. 13 is a graph which illustrates the installation force retained by the end fitting versus the angle of taper.

The graph shown in FIG. 13 illustrates the experimentally found percentage of the installation force retained by the end fitting versus the angle of taper for the cross-sectional area, for the worst case condition using a 0 to 9 degree taper with a locking outer collar and a 0 degree tapered split inner collar. It is evident from this graph that the taper of approximately from 0 to 2 degrees is the most effective.

Any of the various lubricants may be used to help the slipping as the parts slide into place.

Those who are skilled in the art will readily perceive how the principles set forth above may be modified and adapted. Therefore, the appended claims are intended to cover all equivalent structures falling within the scope and the spirit of the invention.

The claimed invention is:

1. A method for attaching a plastic end fitting to a hose having a substantially elastomeric outer surface without requiring metal working of said end fitting, said method comprising:

(a) inserting a single and solid piece into said hose, said single piece being formed of plastic, said single piece having wrench faces with a threaded connector on the proximal side thereof and a non-threaded elongated insert on the distal side thereof, an annular recess on said fitting and next to said wrench faces at the root of the distal end of said insert, said insert having annular barbs for seizing an internal hose surface, (b) fitting a plurality of segments of a plastic non-threaded inner split collar around an outside perimeter of the elastomeric hose with gaps remaining between said segments, said segments having smooth and longitudinally straight inner and outer surfaces fitting over the perimeter of the hose in the area surrounding said insert and in the region of said annular barbs, an annular enlargement on the inside surfaces of the segments forming said inner split collar, said enlargement being shaped to fit into said annular recess for forming a dog lock connection therewith, (c) closing said gap by squeezing said segments together and peripherally into said elastomeric hose substantially without deforming the segments, whereby the smooth inner surface of said inner split collar radially presses the elastomeric surface of said hose with substantial uniform circumferential pressure against said barbs on said insert when said inner split collar is squeezed together, and (d) slipping a plastic non-threaded outer locking collar shaped and dimensioned to slip from said hose over the smooth outer surface of said squeezed together inner split collar and toward said wrench faces for closing said split collar without deforming it and for radially pressing said inner split collar and hose against said insert, the elastomeric memory of said hose pressing said segments outwardly and against said outer locking collar.

2. The method of claim 1 wherein said slipping step (d) further comprises slipping an outer locking collar which has a generally rectangular cross-section over said inner split collar to lock it in place.

3. The method of claim 1 wherein said slipping step (d) further comprises slipping an outer locking collar which has a tapered cross-section with a taper angle in the order of 0 to 6 degrees for wedging said outerlocking collar against said inner split collar.

4. The method of claim 3 wherein said slipping step (d) further comprises positioning said taper of said outer locking collar with its relatively thin end facing toward said dog lock and with its relatively thick end facing away from said dog lock.

5. The method of claim 3 wherein said slipping step (d) further comprises positioning said taper of said outer locking collar with its relatively thick end facing toward said dog lock and with its relatively thin end facing away from said dog lock.

6. The method of claim 1 further comprising the step of forming said insert with a series of a plurality of annular barbs or grooves distributed along a length of said elongated insert which is inserted into said end of said hose.

7. The method of claim 6 wherein said step of forming said barbs further comprises forming each of said plurality of annular barbs with a crest, a collective crests of said plurality of said barbs having a tapered profile rising from a relatively small diameter at a distal end to a relatively large diameter at a proximal end of said insert.

8. The method of claim 6 wherein said step of forming said barbs further comprises forming each of said plurality of annular barbs with a crest, a line along the crests of said plurality of barbs forming a tapered profile rising from a relatively small diameter at a proximal end to a relatively large diameter at a distal end of said insert.

9. The method of claim 1 wherein said forming step further comprises forming said outer locking collar with a tapered cross-section having an angle in the order of 0 to 2 degrees for wedging against said inner split collar.

10. A method for attaching a plastic end fitting to a substantially elastomeric hose without requiring any metal forming tools, said method comprising the steps of:

(a) forming an elongated insert from a plastic having a central area with wrench faces thereon, with a connector means integrally formed on one side of said central area, and with an elongated pipe having a plurality of barbs integrally formed on an opposite side of said central area, said pipe extending from a locking recess on a proximal end of said pipe near said wrench face to a distal and opposite end of said pipe, (b) slipping said elongated pipe into an end of said hose with said plurality of annular barbs engaging an inside surface of said hose, said elongated pipe and hose having mutual diameters which stretch said hose as it fits over said elongated pipe, (c) fitting a plastic inner split collar having a plurality of retaining segments with smooth inner and outer surfaces over and around said periphery of said stretched hose, said plurality of segments fitting against said hoe with a plurality of gaps between them, said gaps closing when said segments are squeezed together, said inner split collar having an annular enlargement which fits into and forms a dog lock with said locking recess, and (d) slipping a plastic outer locking collar with a smooth inner surface over and radially compressing said segments to close said gaps by pressing them against an outside perimeter of said hose without substantially deforming the segment, said segments applying a substantially uniform circumferential pressure against said perimeter of said hose, and dog locking in place, whereby said pipe is held in place by a resilient memory of the elastomeric material forming said hose thereby forcing said segments outwardly with a substantially uniform radial force against said outer locking collar.

11. The method of claim 10 wherein said forming step further comprises forming said outer collar with a tapered cross-section having a taper angle in the order of 0 to degrees for wedging said inner split collar, hose, and insert together.

12. The method of claim 11 wherein said forming step further comprises forming the segments of said inner split collar with a tapered cross-section for wedging said outer collar, hose and insert together.

13. The method of claim 11 wherein said forming step further comprises forming each of said annular barbs with a crest and with a line touching said crests forming a profile of the crests of said annular barbs tapering from one end to the other end of said elongated pipe.

* * * * *